(12) United States Patent
Flatt et al.

(10) Patent No.: US 9,961,379 B2
(45) Date of Patent: *May 1, 2018

(54) PRIORI SCHEDULING OF MULTIPLE ASSETS WITHIN A COLLECTION OF ASSET DELIVERY OPPORTUNITIES

(71) Applicant: Invidi Technologies Corporation, Princeton, NJ (US)

(72) Inventors: Alden Flatt, Edmonton (CA); Brett Kosinski, Edmonton (CA); Jeremy Koopmans, St. Albert (CA); Daniel C. Wilson, Edmonton (CA); David Ballantyne, Edmonton (CA)

(73) Assignee: INVIDI TECHNOLOGIES CORPORATION, Princeton, NJ (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/354,518

(22) Filed: Nov. 17, 2016

(65) Prior Publication Data

US 2017/0070759 A1    Mar. 9, 2017

Related U.S. Application Data

(63) Continuation of application No. 13/429,171, filed on Mar. 23, 2012, now Pat. No. 9,530,148.

(51) Int. Cl.
*H04N 21/234* (2011.01)
*H04N 21/235* (2011.01)
*H04N 21/25* (2011.01)
*H04N 21/258* (2011.01)
*G06Q 30/02* (2012.01)

(52) U.S. Cl.
CPC ... *H04N 21/23424* (2013.01); *G06Q 30/0251* (2013.01); *H04N 21/2358* (2013.01); *H04N 21/252* (2013.01); *H04N 21/25841* (2013.01)

(58) Field of Classification Search
CPC ......... H04N 21/23424; H04N 21/2358; H04N 21/252; H04N 21/25841
USPC .......................................................... 725/34
See application file for complete search history.

(56) References Cited

U.S. PATENT DOCUMENTS

| 6,698,020 | B1* | 2/2004 | Zigmond | H04N 5/44513 348/E5.102 |
|---|---|---|---|---|
| 2002/0104083 | A1* | 8/2002 | Hendricks | H04H 20/10 725/34 |
| 2004/0148625 | A1* | 7/2004 | Eldering | H04N 7/165 725/34 |

* cited by examiner

*Primary Examiner* — Dominic D Saltarelli
(74) *Attorney, Agent, or Firm* — Marsh Fischmann & Breyfogle LLP; Kent A. Fischmann

(57) ABSTRACT

Embodiments of the invention provide systems and methods for constructing a schedule well before the time of an asset delivery opportunity that associates a collection of one or more assets, potentially from multiple advertisers or asset providers, that are planned to play in each asset delivery opportunity. Specific rules for each device also determine which asset each will play, thereby ensuring that campaigns of total asset delivery and asset delivery pacing are approximately fulfilled. This scheduling can be accomplished using marketing data associated with each user device and can be prepared in a practicable period of time using reasonable processing resources.

15 Claims, 4 Drawing Sheets

PRIORI SCHEDULING OF MULTIPLE ASSETS WITHIN A COLLECTION OF ASSET DELIVERY OPPORTUNITIES

CROSS REFERENCE TO RELATED APPLICATION

This application claims priority to and is a continuation of U.S. patent application Ser. No. 13/429,171, entitled "A PRIORI SCHEDULING OF MULTIPLE ASSETS WITHIN A COLLECTION OF ASSET DELIVERY OPPORTUNITIES," filed on Mar. 23, 2012, which in turn claims the benefit of U.S. Provisional Application 61/466,769, entitled "A PRIORI SCHEDULING OF MULTIPLE ASSETS WITHIN A COLLECTION OF PLAY SPOTS," filed on Mar. 23, 2011, the contents of which are incorporated herein as if set forth in full.

FIELD OF THE INVENTION

The present invention relates generally to broadcast networks such as cable television, satellite television or radio networks, and, more particularly, to targeting broadcast assets in the context of a priori scheduling of asset delivery opportunities.

BACKGROUND OF THE INVENTION

Currently, many advertisers or other asset providers place commercials, public service announcements, product placement overlays, or other assets within broadcast programming such as television programs in order to provide their messages to consumers. Though the associated asset delivery opportunities can occur within programming or during breaks in programming, typical asset delivery opportunities include a number of commercial play spots, or ad spots, included in a commercial break. Each program on each ad supported programming channel has certain periods of time or screen/audio clip space, the "asset delivery opportunities," set aside to sell to asset providers and in which the asset providers place their assets.

Asset providers often desire to have their assets seen by specific types of people within the total audience that have certain audience classification parameters (classifications), for example, dog owners or males 25 to 49 years old. In this regard, the asset provider may specify targeting parameters, corresponding to such classifications, in connection with each asset that define the targeted audience. Such classifications and targeting parameters may be defined in terms of demographics, interests, psychographics, geography, purchasing behavior or any other information of interest to asset providers or potential asset providers. The asset provider typically accesses a contracting platform (or works with agency personnel) to arrange for placement of an asset or set of assets in specified asset delivery opportunities or to purchase a specified number of impressions over a defined time period. The targeting parameters, delivery goals and other constraints or specifications regarding delivery of an asset or assets define a campaign. When an asset is delivered by the user equipment device (e.g., a television/set top box, computer or other data terminal or a wireless device), those users with the correct classifications (the targeted audience) successfully receive an impression of the asset, and the asset may also be delivered to other untargeted members of the program audience. Generally, only successful delivery of an asset to a targeted audience member counts towards satisfying a campaign.

Presently, asset providers select asset delivery opportunities within networks, times, and programs which have measured viewing ratings for classifications such that a relatively large proportion of the audience satisfy the desired targeting parameters. Audience sampling, such as that performed by Nielsen Media Research Corp. (Nielsen), was established to delineate audiences into sectors. For example, the audience sampling may classify audience members into groups based on gender, ethnicity, income level, number of family members, locale, etc.

Audience sampling is often performed via the monitoring of selected households. For example, a monitoring company may provide equipment to a number of households. The member households may comprise a fairly diverse audience with profiles in each household being known to the monitoring company. As such, a monitoring company may monitor the observation patterns of the member households to roughly associate audience profiles with certain content (e.g., television programs). That is, the monitoring company roughly extrapolates the observation patterns of the member households to the audience at large; a process that produces what is generally referred to as ratings.

The case of television advertisements is illustrative. Today, advertisers direct their assets based on ratings. For example, an asset provider may wish to display an ad within a certain programming time slot if the rating for that time slot substantially corresponds to the target audience for the asset (e.g., an asset provider may wish to show a shaving add during a programming time slot having a relatively high rating among males between the ages of 18 and 32). In the best case, however, a significant mismatch of the audience to advertisers' targets still occurs. For example, a programming time slot having a relatively high rating among males between the ages of 18 and 32 may still have a relatively large percentage of female viewers or other viewers that are not of interest to the advertiser.

Audience information may also be obtained via surveys. For example, survey samples may indicate that 15% of television viewers watch a particular channel at 6:00 pm and see a particular news program, and that 35% of these viewers own a dog, which may be higher than average and enough for an asset provider to decide to purchase an asset delivery opportunity in the program to play a dog food ad. It is likely that many audience members of an asset delivery opportunity (in a non-targeted asset delivery system) will still not match any such specific targeting parameters, and delivery of the asset to such audience members may be considered by the asset provider as wasted. As pricing for the asset delivery opportunity is typically based on the targeted audience, delivery to untargeted audience members is also wasted from the perspective of the programming provider and/or network operator.

Targeted asset delivery, as in the Advatar® system marketed by Invidi Technologies Corporation, improves the efficiency of asset delivery by (in one instantiation of the product) sending multiple assets to user devices and programming those user devices to select to deliver one asset from amongst those available that matches (or best matches) the classifications of that user or household, or is otherwise selected for delivery based on delivery criteria or other constraints. Classifications can be assigned to devices, households, or individuals based on data provided by third party demographic databases or other data sources. Additionally or alternatively, device resident classifier systems may continually estimate the likely makeup of the current audience of a particular device. For example, the device might only deliver a shaving ad if a male aged 25 to 49 is likely currently present, or a dog food ad if the device is associated with a dog owning household. This optimizes successful impression delivery and reduces the waste of delivering assets to users who are not in the targeted audience.

SUMMARY OF THE INVENTION

Scheduling of assets is a significant challenge in broadcast networks. Such scheduling generally involves selecting assets for potential delivery in connection with each asset delivery opportunity (or as many as possible) of each program. In the context of a broadcast television network, asset delivery opportunities may be provided within programming (e.g., digitally replaceable product placement opportunities), overlaid on programming (e.g., pop-up ads, crawlers, etc.), or in interruptive spots (e.g., during commercial breaks). These asset delivery opportunities may be populated, for example, by content providers (e.g., studios), broadcast network providers (e.g., ABC, NBC, CBS, BBC, CNN, etc.), local affiliates, operators (e.g., Multichannel Video Programming Distributors—"MVPDs"—such as cable television operators), or others, and scheduling may be performed at multiple geographic or distribution levels, such as on a national level, regional level and local level. The present invention provides a scheduling tool that can be used in any and all of those levels and contexts. Moreover, the scheduling tool can work in conjunction with targeted asset delivery systems to enable scheduling of assets for targeting to the household and even the individual user level.

Many factors may be considered in relation to scheduling. As noted above, an asset provider may specify targeting parameters for a targeted audience. In addition, the asset providers, alone or in connection with programming networks or network providers, may specify a variety of other delivery specifications relating to, among other things, frequency of delivery, sequence of delivery of multiple assets, time of delivery, acceptable or unacceptable networks, acceptable or unacceptable programs, proximity to assets of competitors or otherwise undesired assets/asset providers, total impressions, rate of impressions, delivery cost (typically specified in cost per thousand impressions or CPM), keyword association, or others. Moreover, scheduling is generally conducted well in advance of asset delivery and is often based on ratings, surveys or the like. This information provides rough estimates, at best, of the future audience and may not be well correlated to specific targeting parameters of asset providers. It will thus be appreciated that optimizing asset scheduling in any broadcast network environment can be difficult.

The complexity of scheduling is even greater in targeted asset delivery contexts. In these contexts, it is not only desired to schedule an asset for each asset delivery opportunity, but (in some systems) to schedule multiple assets for at least some of these opportunities. Moreover, scheduling considerations for multiple assets in one or multiple asset delivery opportunities may be interdependent. For example, scheduling one asset for a given asset delivery opportunity may reduce the potential audience for another asset during that asset delivery opportunity (e.g., because of overlapping target audiences) or may impact scheduling for an adjacent or nearby asset delivery opportunity (e.g., because of constraints concerning assets of competitors, because scheduling is performed collectively for a multi-spot break, etc.). The scheduling tool of the present invention is useful in conventional and targeted asset delivery contexts and renders these problems tractable, thus allowing for significant scheduling optimization using reasonable processing resources.

Accordingly, embodiments of the inventive scheduler described herein determine a schedule for a collection of assets to be placed such that possibly more than one asset is within each of a collection of asset delivery opportunities on various programming channels. The scheduler can determine this schedule well before the play time of the assets (e.g., twenty-four hours ahead). This schedule may incorporate declared or deduced campaign priorities that specify that any asset of a campaign with higher priority may be delivered in an asset delivery opportunity in preference to any asset of the campaign (or another campaign) of lower priority.

In some embodiments, each of multiple devices independently tunes to a collection of channels at various times and independently selects an asset to deliver for each asset delivery opportunity according to its own particular classifications and the given priorities (which may be either global or local to that device). Estimates of actual impression deliveries are used to produce later schedules that place assets in such a way as to approximately satisfy the delivery pacing and total impression delivery requirements of campaigns for each asset. Correction of delivery pace may occur through a feedback loop that makes use of predicted asset delivery based on classifications sampled from a collection of user devices in comparison to actual impression deliveries. Such estimates can also or alternatively be used for managing asset delivery inventory.

In accordance with one aspect of the present invention, a method and apparatus ("utility") is provided for estimating audience sizes in contexts where multiple assets are scheduled into a given asset delivery opportunity, e.g., targeted asset delivery contexts. This may be useful for scheduling, inventory management, and other purposes. The utility involves selecting first and second assets for audience estimation with respect to a first asset delivery opportunity where the assets have an interference due to overlapping targeted audience segments. For example, if the first asset targeted pet owners and the second asset targeted males aged 18-34, an interference would result due to the existence of members in the overall audience for the first asset delivery opportunity who are pet owing males 18-34 years old. The utility further involves estimating an audience size for at least one of the assets taking into account the interference.

There are a number of ways that the interference could be resolved, and the manner of resolution can impact the audience size estimation. For example, the interfering audience segment could be split between the two matching assets, e.g., randomly, substantially evenly based on selection logic for resolving such interferences (under control from the network, implemented by logic resident at a user equipment device, or a combination thereof), or in a weighted fashion favoring one or the other of the assets. In any of these cases, the audience size estimation logic mathematically reflects the corresponding basis for resolving the interference.

In one implementation, one of the assets is prioritized in relation to the other asset such that the prioritized asset is delivered to all, or at least a majority, of the interfering audience segment. For example, this can be accomplished by considering assets for scheduling into the asset delivery opportunity in order of priority such that the interfering segment is assigned to the higher priority asset and is subsequently unavailable for assignment to the lower priority asset. The effect is that the interfering segment is subtracted from the audience that would otherwise have been estimated for the lower priority asset. Such prioritization may be negotiated by the asset provider or may be determined based on campaign needs (e.g., which assets are in need of impressions to meet campaign specifications) or other business/non-business considerations (e.g., which asset, all other things being equal, yields the greatest revenues for delivery to the interfering segment).

Audience size can be estimated using any one or more of a variety of empirical or theoretical techniques. For example, in some cases, reliable ratings information that matches up well with targeting parameters may be available. In such cases, audience estimates may be based on ratings with appropriate consideration of the interfering segments. In many cases however, ratings information may be unavailable or unreliable, e.g., due to a small share of the associated programming or targeting parameters that do not match conventional ratings demarcations. Moreover, a network operator may aspire to provide, or asset providers may demand, better guarantees concerning asset delivery, particularly in targeted advertising contexts where delivery decisions are being executed, at least in part, by user equipment devices. In such cases, audience size estimates may be based on signaling (e.g., pre-delivery votes, post-delivery reports and/or presence/classification information generated in the network based on click-stream or other data) from at least a sampling of relevant user equipment devices or may otherwise be based on an aggregation of expected delivery decisions for individual devices (e.g., based on demographic/purchasing information for users from a third party database). It will be appreciated that such information may be obtained from all devices to provide an accurate basis for estimation. However, a smaller sample (preferably obtained so that it is still statistically sufficient for the purpose employed) allows for reduced usage of bandwidth for messaging and/or reduced processing while yielding the desired information. Moreover, estimates based on such predictions may be adjusted based on feedback related to differences between previous predictions and actual reported delivery.

In accordance with another aspect of the present invention, a process for iteratively considering assets for scheduling into each of a series of asset delivery opportunities is provided. The utility involves, for a first asset delivery opportunity of a set of opportunities, identifying a set of available assets for scheduling and selecting one of those assets based on an applicable prioritization (e.g., based on any of the prioritization bases described above). For the selected asset, a determination regarding scheduling is then made based on audience size information for the asset delivery opportunity and campaign specification information for the asset. For example, based on an overall impression goal for a campaign, a daily pacing value may be determined. That value may be compared to an estimated audience size for the asset delivery opportunity (or an overall estimated audience size for a set of opportunities or apportionment thereof). This process may be repeated for another asset or assets until the asset delivery opportunity is fully scheduled (scheduled to a desired level) and then repeated for the next asset delivery opportunity. For example, a full day's worth of asset delivery opportunities for all relevant programming on all relevant bandwidth may be batch scheduled in this fashion. In conjunction with this iterative process, audience interferences may be considered and resolved as described above. In this manner, scheduling can be optimized, even in contexts where multiple assets are placed into individual asset delivery opportunities, in a timely fashion using reasonable processing resources.

BRIEF DESCRIPTION OF THE DRAWINGS

For a more complete understanding of the present invention and further advantages thereof, reference is now made to the following detailed description taken in conjunction with the drawings in which.

DESCRIPTION

Figure 1:
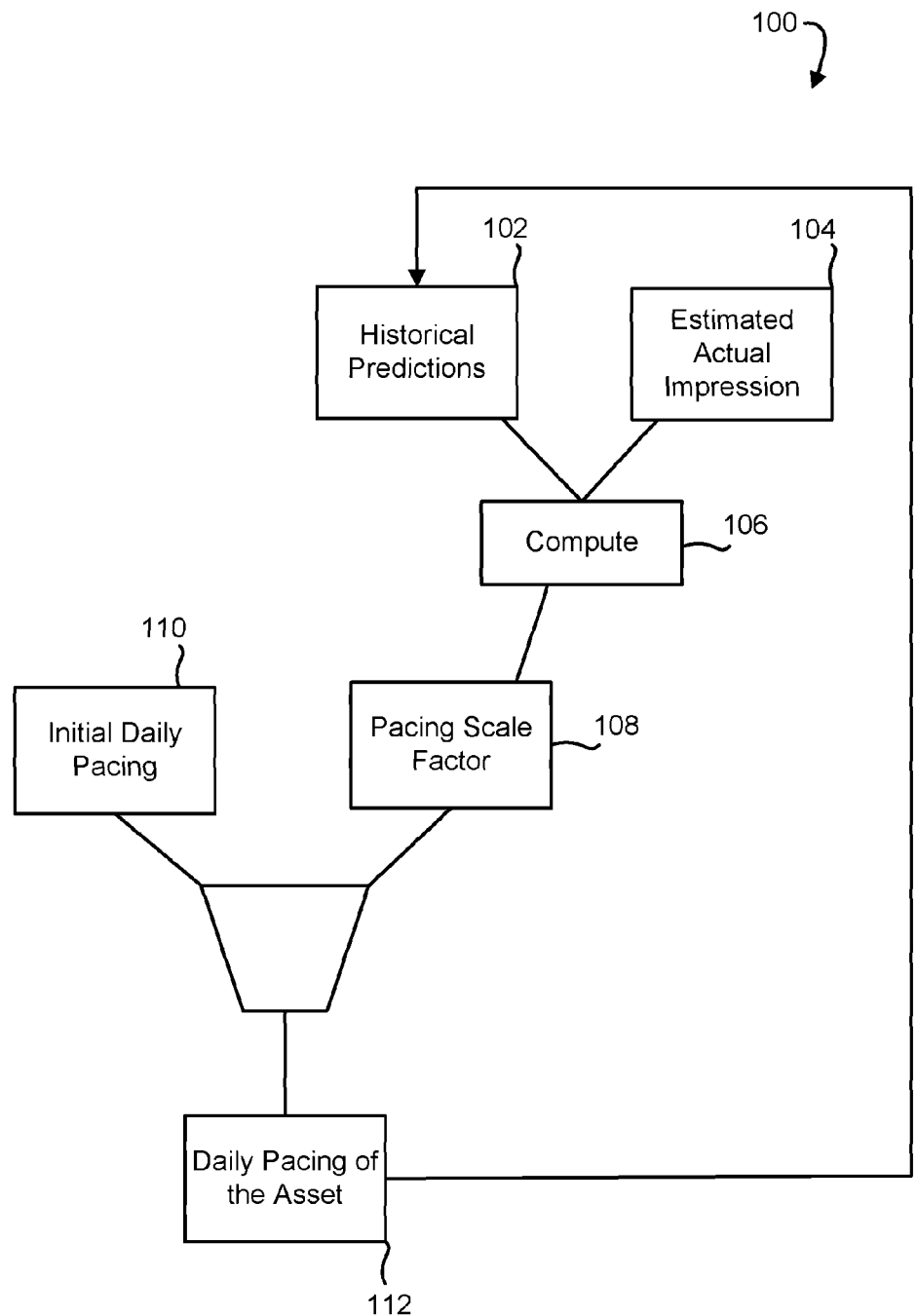
FIG. 1 is a schematic diagram of an asset pacing process in accordance with the present invention.

In the following description, the invention is primarily set forth in the context of scheduling ads for delivery during a commercial break in a broadcast television network (e.g., cable television, satellite television or terrestrial airwave television network). However, it will be appreciated that certain aspects of the invention are more broadly applicable in other scheduling contexts (e.g., product placement, overlay, PSAs, etc.) in other communications networks (e.g., satellite or terrestrial radio, or other networks involving scheduled delivery of assets). The following description should therefore be understood as illustrating an implementation of the invention, and not by way of limitation.

Conventionally, asset delivery opportunities in broadcast networks were scheduled so that only one possible asset would play in each asset delivery opportunity for the entire audience (at least within a geographic region) of particular programming. In targeted asset delivery systems, multiple assets may be available for delivery to different segments of the audience at a given asset delivery opportunity. As described in U.S. Pat. No. 8,108,895, entitled "Content Selection Based on Signaling from Customer Premises Equipment in a Broadcast Network," which is assigned to Invidi Technologies Corporation and is incorporated herein by reference (the "Invidi patent"), this may involve audience aggregation and/or spot optimization. Audience aggregation generally refers to aggregating audience segments (less than or equal to the whole audience) from multiple asset delivery opportunities (generally for different channels or bandwidth segments) to form an aggregate audience for satisfying (at least in part) an asset delivery request. Spot optimization generally refers to delivering different assets to different audience segments of a single asset delivery opportunity. In one improved model, called single-advertiser spot optimization or "SASO," multiple assets from a single advertiser or other asset provider are available for delivery in a single asset delivery opportunity. In one instantiation, each device independently picks one of the assets to deliver that matches, at least in part, the current classifications at that device (and/or satisfies any other targeting constraints or considerations). In another model, called multi-advertiser spot optimization or "MASO," the same functionality is implemented with respect to assets of multiple advertisers or other asset providers.

In the aggregation delivery model, multiple assets from any of a number of asset providers may be delivered to user devices before or at the time of the asset delivery opportunity, and each device may independently select the asset that it will play from amongst all those available to it at that time. An aggregate audience can thus be constructed from audience segments of different asset delivery opportunities. Various aspects of the present invention are useful in any of these contexts.

As described in the Invidi patent, the targeted asset delivery system may use voting, involving transmission of information from the devices to the targeted asset delivery system, to decide which assets will be sent along potentially resource constrained asset delivery channels to be available to the devices. This system may also utilize asset delivery notifications, returned from the devices to the targeted asset delivery system after the asset has been delivered, in order to estimate how many targeted impressions each campaign receives over time to estimate when each has fulfilled its total delivery requirements. As described below, the present invention can utilize such voting, asset delivery notifications, or other signaling to gather information for use in improved scheduling of assets.

Embodiments of the system described herein make it possible to construct a schedule, well before the time of the asset delivery opportunity, for a collection of one or more assets, potentially from multiple asset providers, that are available for delivery in each asset delivery opportunity. At the same time, specific rules for each device determine which asset will be delivered. The system ensures that campaign specifications of total asset delivery and asset delivery pacing are approximately fulfilled even as individual devices apply their own rules and make their own asset selections. This scheduling can be accomplished using classifications associated with each device, together with any other delivery specifications, and can be prepared in a practicable period of time using reasonable processing resources.

It will be appreciated that in the context of a broadcast television network, the resulting overall impression delivery system schedules assets from campaigns into asset delivery opportunities on various channels for each new coming day, given the contracts with asset providers. The devices, in a preferred implementation, are provided the relevant assets and assignments of assets to asset delivery opportunities, and may further be provided and/or determine asset priorities and other considerations affecting asset delivery. The devices may further include logic to deliver assets that have targeting parameters that match their classifications and satisfy any other delivery considerations. When generating schedules for each new day, the associated method causes the system to meet, or at least attempt to meet, ultimate impression delivery goals for each campaign, and also approximately meet daily pacing requirements for each campaign. To the extent that it is not possible to deliver assets so as to meet all delivery goals, the method can optimally deliver impressions according to delivery priority considerations.

However, determining how to schedule assets into delivery opportunities is difficult for a number of reasons. One difficulty is that the extent to which placement of an asset into an asset delivery opportunity will generate impressions of that asset may not be perfectly predicted. For example, two factors can frustrate this prediction. According to a first factor, as with traditional asset delivery scheduling, it may be necessary to predict the audience size for each program. Traditional techniques typically rely on the use of program ratings from previous time periods (which is, in turn, based on sampling of TV audiences in broadcast television networks). Unfortunately, in one implementation, this technique has significant error at least for programs attracting less than 0.3% of the viewing audience. In some broadcast networks, such programs may collectively constitute a significant portion of the total broadcast network audience. A second factor arises because of correlations related to the classifications of particular users and particular programs. For example, a television show about dogs might have a viewership of 1.5% of the general audience (in the parlance of ratings, a rating of 1.5), but a viewership proportion of 3.0% amongst dog owners, and likely the available data only provide ratings for the general audience.

Another difficulty with determining how to schedule each asset into asset delivery opportunities is that assignment of multiple assets to an asset delivery opportunity may induce correlated interactions associated with the targeting parameters for the various assets. For example, suppose an asset targeted for dog owners is assigned to an asset delivery opportunity to which another asset targeted to males aged 25 to 49 is also assigned. Presumably some dog owners are men in this age range, so some user devices may select the asset to deliver based on priority of these assets or based on random draw. The issue may arise from the overlap not being independent, such that males of these ages may be more or less likely than the overall population to own dogs. In the limiting cases, if all such men owned dogs, a dog owner targeted asset that had priority would result in no deliveries of the male targeted asset; but if no such men owned dogs, deliveries of the male targeted asset would be unaffected by the higher priority dog owner asset.

Similarly, there may be very strong "hidden" correlations. For instance, an asset that targeted Catholic Priests, may not correlate well if co-assigned with any asset targeting men based on typical factors. Predictions can still be made, but they will only be approximate, and there may be a consistent bias in these predictions (although the bias may vary from campaign to campaign). At the same time, interactions involving priority may be particularly difficult to model.

Also, any data regarding how many impressions were actually delivered for each asset may typically only be approximate. The scheduler may have to generate a useful schedule regardless of these facts.

Embodiments of the present invention address these scheduling system issues at least using feedback through a scaling factor that controls the pace of asset delivery. The system still actually schedules the assets into asset delivery opportunities. This is accomplished by the scheduler, which assigns (possibly multiple) assets to asset delivery opportunities so that the resulting impression deliveries for each asset over the next day are approximately equal to the scaled daily pacing. To do this, the scheduler makes use of efficiently computed approximate predictions of impression delivery to assign asset deliveries greedily into possible asset delivery opportunities, given the constraints. The scheduler may repeat this process to schedule additional days beyond just the next day.

In order to schedule assets, the scheduler may have access to the efficiently computed approximate impression delivery predictions. Computing these predictions can be difficult, for example, because the data covers many user devices and the assets could be assigned to combine the classifications of the devices in exponentially diverse ways. This problem can be addressed (e.g., for interactions involving classifications correlations) by sampling from the device classifications and constructing efficient tabulations of satisfactory device-asset pairings. Then, these tables can be used to rapidly calculate predictions of the number of impression deliveries amongst the sample, which can then be extrapolated to predictions for the whole viewing audience.

Embodiments of the present invention address traditional scheduling issues in different ways. According to some embodiments, each campaign is assessed a daily pacing requirement of the number of impressions equal to the number left undelivered in the campaign divided by the number of days remaining in that campaign, referred to herein as the "initial daily pacing." This value is scaled by a correcting amount, referred to herein as the "pacing scale factor." Pacing and associated scale factors can be calculated on bases other than daily and may be related to asset delivery opportunities (or derivatives thereof) rather than time.

As shown by the exemplary process 100 of FIG. 1 to calculate the pacing scale factor, the data from some prior range of days of scheduling this campaign can be used. For example, the total number of impression deliveries predicted (102) to occur, based on such historical data, across all of those days can be divided by the total estimated number of impressions actually delivered (104) to compute (106) the pacing scale factor (108) for that campaign. If no prior days of deliveries for this campaign are in the designated range of days, then 1.0 can be used for the pacing scale factor. A new daily pacing value for the campaign can be calculated as the initial daily pacing (110) multiplied by this pacing scale factor, which is referred to herein as the "daily pacing of the asset" (112). Notably, the pacing scale factor will typically change from day to day and it can be less than or greater than 1.0.

While use of "daily pacing" is a practical implementation, it will be appreciated that other pacing periods (e.g., 6 hours, 12 hours, 2 days, one week, etc.) may also be practical or even preferred in some scheduling environments. Moreover, there may be many factors, besides the pacing value and estimated audience size, considered in scheduling, e.g., constraints regarding channel of delivery, program associations, proximity to assets of competitors or types of products, frequency of delivery, etc. These considerations may be applied as a threshold matter when a set of assets is identified for consideration for scheduling, in the scheduling step and/or as decisions are made (e.g., by the specific devices) regarding delivery.

Specific embodiments of the scheduler use the daily pacing value for each asset together with the estimated audience size for each asset delivery opportunity to generate an assignment of one or more assets to (or perhaps exceeding in some cases) asset delivery opportunities. The result of this may be generally referred to as the "schedule." The goal may be to schedule all assets within available asset delivery opportunities up to the delivery of the daily pacing of each asset, or at least to schedule as many impressions of assets up to their daily pacing as possible. In some embodiments, higher priority assets are delivered with preference. Such priority may be specified by asset providers and/or surmised. In the latter regard, priority may be assigned based on the number of days left in a campaign, the relative values of delivery for the assets (e.g., in terms of CPM), the relative difficulty of satisfying delivery specifications for the assets (e.g., due to a very specific or hard to find target audience), etc. Subject to this optimization under constraint on the available asset delivery opportunities, assets may be assigned to asset delivery opportunities so that the sum across asset delivery opportunities of predicted impression deliveries for each asset for the next day is approximately equal to the daily pacing for that asset. These predictions of deliveries can take into account the combined interactions of all other assets assigned to each asset delivery opportunity.

Scheduling may also optionally satisfy other parameterized constraints, including, for example, a maximum number of assets to assign to any one asset delivery opportunity (e.g., based on the available asset channels or bandwidth/storage available for alternate assets as described in the Invidi patent), and a minimum on the proportion of predicted eventual viewers of an asset delivery opportunity for which any scheduled asset is predicted to play. There may be further constraints on asset assignments, such as that an asset is not to be delivered twice in less than a prescribed period of time, or that two assets from competitors may not be delivered in adjacent asset delivery opportunities. Specific implementations of the system can accommodate any such additional constraints that can be precisely defined in terms of assets and asset delivery opportunities and times.

Figure 2:
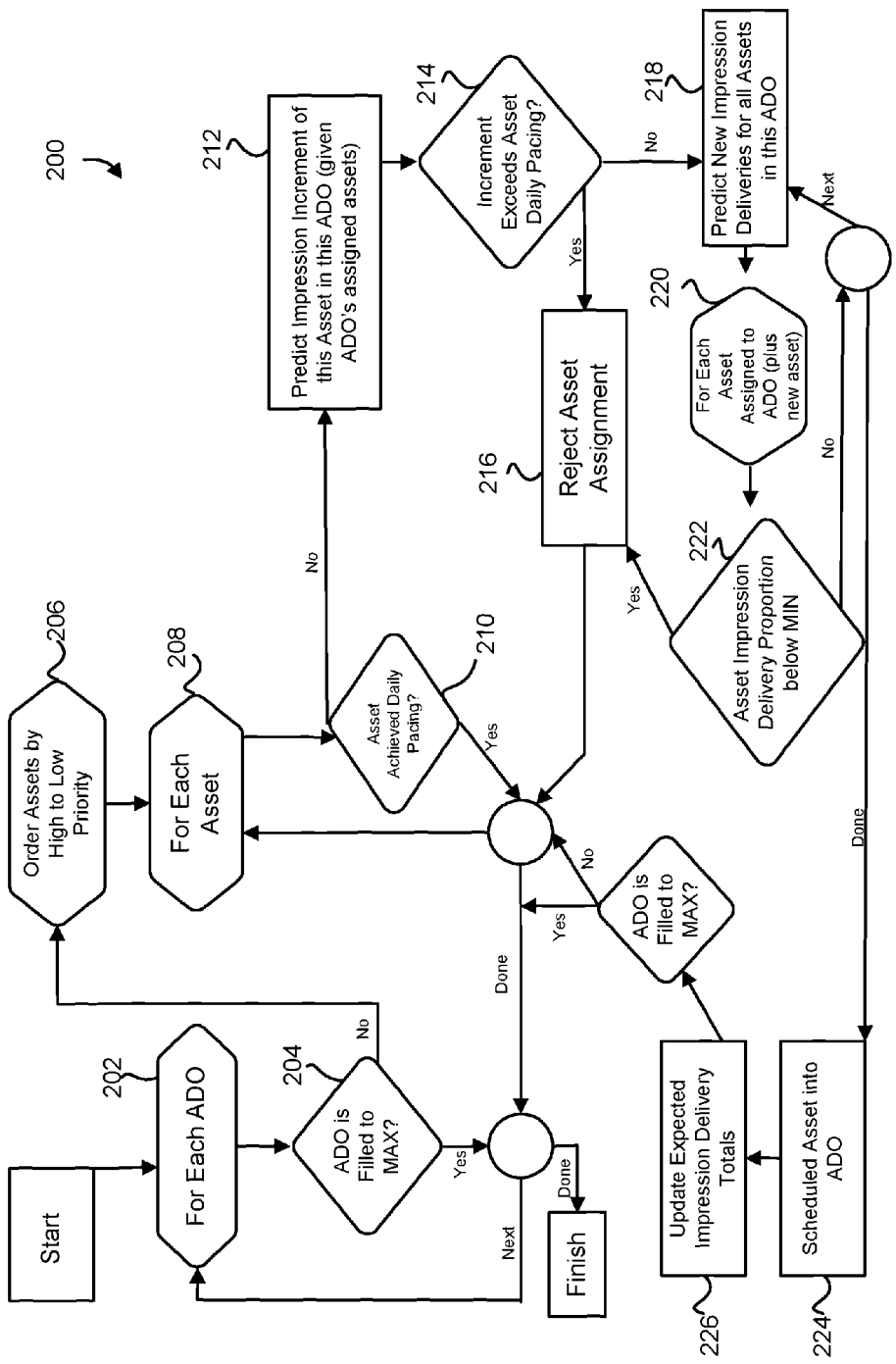
FIG. 2 is a flow chart illustrating a scheduling process in accordance with the present invention.

Some implementations of the scheduler can be considered "greedy" implementations. A greedy implementation of the scheduler may consider each asset delivery opportunity within the next day in turn, and engage the process described below for each. An illustrative process 200 for scheduling according to various embodiments is illustrated in FIG. 2.

First, for each asset delivery opportunity (202), a decision is made (204) as to whether the asset delivery opportunity ("ADO" in the figures) is filled or is available to be populated with additional assets. In a traditional, single asset per asset delivery opportunity context, this decision may simply involve determining whether an asset is scheduled for that asset delivery opportunity or not. In targeted asset delivery systems such as described in the Invidi patent, this may involve, for example, determining or estimating how many asset options should be available for the asset delivery opportunity, determining whether this set of asset options should be under-subscribed, fully subscribed or over-subscribed, etc. In any event, if the asset delivery opportunity already has a maximum number of assets assigned to it, the process advances to the next asset delivery opportunity (if any remain). Otherwise, assets are ordered (206) by delivery priority from highest to lowest, and each is considered in turn, so long as it has not yet been assigned to asset delivery opportunities sufficient to achieve its scaled daily pacing (210). As noted above, such prioritization may be specified by the asset provider or based on how much time is left in the campaign, the value of delivery, a contract or other relationship with the asset provider, etc. In certain implementations, the ordering of assets having equal priority is shuffled from day to day (e.g., and the order in which the assets are considered within the day should be rotated for each asset delivery opportunity), to equalize which assets will be selected for which asset delivery opportunities.

For each such asset (where the daily pacing requirement has not already been met), the process 200 may calculate or predict (212) the increase in impression deliveries predicted for the asset if it were added to those already assigned to the asset delivery opportunity being considered. If this would put the total deliveries for the asset over a value related to its daily pacing (214), the assignment can be rejected (216) and the next asset can be considered in turn. Otherwise, the process can calculate the number of impression deliveries predicted for each asset that would be assigned to the asset delivery opportunity under consideration. It will be appreciated that this decision may not be strictly based on daily pacing. For example, scheduling may be allowed even though the estimated audience slightly exceeds the daily pacing, e.g., because the difference is small and can be compensated for in subsequent days and/or because that asset is the best option in spite of exceeding daily pacing.

If any asset audience size is below the required minimum proportion of the global constraint, that assignment can be rejected, and the next asset can be considered in turn. If the constraint is not violated, the asset can be scheduled into the asset delivery opportunity, and the new predicted impression delivery totals for every asset assigned to the asset delivery opportunity can be updated (218). As noted above, such re-calculations may be desired, for example, in a MASO context where the newly assigned asset is projected to diminish the audience for another asset due to overlap or interdependencies of the assets' respective targeted audiences. Such effects can be estimated theoretically or empirically based on ratings, surveys, or like. In the system described in the Invidi patent, these effects can be estimated, at least in part, based on user device voting, reporting or the like for the asset delivery opportunity under consideration or other asset delivery opportunity(ies), (e.g., similar previous asset delivery opportunities). In certain implementations, the asset assignment is also rejected if any of the optional further constraints, as described above, are violated.

Some embodiments compute the impression delivery predictions for sets of assets assigned to asset delivery opportunities as follows. Note that this technique ignores correlations between targeted classifications and channel viewing preferences, and instead uses the total audience ratings for each asset delivery opportunity. Alternatives that account for such correlations are subsequently described.

Before starting any computations, a suitably sized random sample of the devices for which data is available is selected, and the classifications for each are gathered. In some cases, classifications may be based on closely corresponding historical data concerning assets delivered by such devices. In other cases, estimates may be based more generally on classifications associated with a household. In a multi-viewer setting, such classifications may relate to different viewers who may use a particular device at different times, thereby complicating estimates. In such cases, classifications related to all users may be obtained (though such classifications may or may not be indexed to any user or putative user, e.g., such classifications may be anonymous) or classifications specific to the asset delivery opportunity (e.g., based on time of day, day of week, channel, program, keyword, etc.) may be obtained. A vector of bits is generated for each asset. For example, for each device, the bit is assigned as ON if the asset targets the device, and OFF if the asset does not target the device. In this context, ON indicates a possibility that the asset would be delivered at that device. States other than "ON" or "OFF" may optionally be considered, e.g., a real-valued probability of a match or "goodness of fit." It may be desirable to ensure that the order of the association of bits with devices is consistent across the assets.

Accordingly, given any asset delivery opportunity and a set of prioritized assets, the predicted impression delivery of one of those assets can be calculated as follows:

Let the bit vector of the one asset we are predicting be called A, the bit vectors of each higher priority asset be called $B_1, B_2, \ldots, B_k$, and the bit vectors of the equal priority assets be called $D_1, D_2, \ldots, D_j$.

Calculate A' as A with the Bi's masked out through the logical operation:

$$A' = A \text{ AND } (\text{NOT } B_1) \text{ AND } (\text{NOT } B_2) \ldots \text{ AND } (\text{NOT } B_k),$$

where the vector A' indicates the devices for which this asset will possibly play, since there are no higher priority assets scheduled for that device.

An integer vector C can then be calculated as the count of equal priority assets for each addressable device by the operation:

$$C = A' + (A' \text{ AND } D_1) + (A' \text{ AND } D_2) \ldots + (A' \text{ AND } D_j),$$

where this addition considers logical ON as 1 and logical OFF as 0 and sums component-wise.

A vector E can then be calculated as expected impression deliveries per device by the operation:

$e_i = 1/c_i$, if $c_i$ is not zero, or $e_i = 0$, if $c_i$ is zero, for each component $e_i$ of E and $c_i$ of C.

The predicted impression deliveries of the asset over the sample devices can then be considered as the sum of the components $e_i$ of E multiplied by the rating of the asset delivery opportunity.

Alternative mechanisms for forming the vector C (and E and the final result) described above do take into account the correlation between targeting and the underlying programming. The process described above, involves counting the households that match the targeting pacing (forming C) and eventually estimating delivery by calculating E and multiplying by the rating of the program (it is this step that incorporates the independence assumption and ignores correlations).

However, you have click-stream information for all devices is available at the head end (or other location of the processing platform)—or at least a large sample of such information available—then predictions can be made about whether particular devices will be turned on and consuming television content for any given asset delivery opportunity (e.g., for a particular device, based on the last 13 weeks of television viewing, it may be estimated that there is an 87% likelihood that the device will be turned on at a particular time and tuned to channel 14). Then, rather than count the number of devices that match as in the scheduling example, the probabilities for the devices that match can be used to form a probabilistically based estimate of the number of viewers. Of course this may still be a sample and, if so, it can be scaled for the whole audience. This technique implicitly solves the correlation problem because it uses actual data about matching devices that may be tuned to the relevant channel (in the context of a television network). It introduces a new error but this kind of error is very similar to existing errors in ratings data.

Many variations on this theme are possible. For example, one objective of using the click-streams as set forth in the preceding description is to be able to make a probabilistic estimate of whether individual user devices are turned on and are available for delivering an asset at a given asset delivery opportunity. In the alternative, you can use raw (i.e., not aggregated) asset delivery notifications or ADNs (as described in detail in the Invidi patent) or raw votes if available to form similar predictive information about individual devices.

It should be noted that click-stream data often lacks any indication of device state, e.g., whether the device is turned on or off whether a viewer is present. Typically such click-stream information simply includes a time stamped sequence of channel changes. Generally, then, you can use an algorithmic mechanism can be used to decide if a viewer is likely present—e.g., based on a time decay function from the time of the channel change. The assessment may be discrete e.g., 37 minutes after a click it is deemed that, absent another click, the viewer has left; or it may be a continuous probability function that declines after a channel change. As described in the Invidi patent, such a process can also be carried on in the device as a "presence detector."

In the present context, this detection may be implemented in conjunction with ADNs. At least two modes exist for sending ADNs back in this regard. The first is to use the device resident presence detector and not send back an ADN if there is no implied viewer (or send back a probability). However, suppose that no presence detection is executed in the device and/or an ADN is sent regardless of presence—in this circumstance the click-stream processing approach could be used to time decay ADNs (which contain channels numbers) and decide that even though an ADN has been returned, it is for the same channel as the previous ADN (or series of ADNs) and therefore there is no viewer.

A still further alternative uses historical data about how well predications worked for specific targeting in specific places to improve predictions for the same (or similar) specific targeting in the same (or similar) specific places. This is an alternate technique to form the audience size estimate. This is another way to attack the "independence assumption." The preceding discussion involved using either device click-streams or individualized ADN sequences (or perhaps votes). The technique described now does not use either, although it does use aggregated delivery statistics. This technique could be applied either on a time-of-day (TOD) basis or a program basis. That is to say, it can be applied to either the correction for a program, such as "CSI," or a time slot, such as 20:00-20:30 Friday. In either case, the predictive system in the scheduler makes a prediction about how the audience for a particular asset delivery opportunity will be broken down. That prediction may be compared to the actual breakdown of the audience as reported by ADNs and a correction for the targeting can be determined.

Consider the following:

| Priority | Targeting | Predicted Audience Fraction | Actual Delivery | Correction Factor |
|---|---|---|---|---|
| Top | A | 35% | 20% | 0.57 |
| | B | 30% | 20% | 1.0 |
| | C | 25% | 25% | 1.0 |
| Bottom | D | 10% | 25% | 2.5 |

The first three columns show the a priori audience allocation that was computed by the scheduler for a given asset delivery opportunity. Suppose that the delivery statistics were as shown in the fourth column. It is clear from this that the original computation for the delivery to target A (which may be arbitrarily complicated targeting criteria) overestimated the delivery (from which we can conclude there is likely a negative correlation between the underlying programming/TOD and the targeting). Similarly, the audience size for D was significantly underestimated—likely a strong positive correlation.

For each of the targets, a correction factor can be computed (which will be specific to either this TOD or program) as a simple ratio between predicted and actual delivery. Several correction factors for a same targeting and TOD/program can be averaged in some manner (e.g., a geometric mean) to build a correction factor that can be used in the future when that targeting is used again in the same program/TOD, as a specific example, all of the correction factors for "D" in "CSI." When a subsequent audience prediction for the delivery to viewers matching targeting criteria "D" in "CSI" the predicted audience size is multiplied by the correction factor, and the corrected values are used as the new prediction.

The calculations in the above table are done based on the share of the audience for the prediction and the measured result. In this way, any differences in the overall rating for the program are automatically factored out. However, when applying the correction factor to the new predictions, the factor should be applied to calculated audience size, not the proportion of the audience.

Note that the correction factors should be periodically or continuously updated. In this circumstance, the previously used correction factor may be averaged with newly calculated correction factors (e.g., a weighted geometric mean). Some provision may be made to discover anomalous new correction factors and then discard them or, similarly, to discover that there is a new trend and that the old correction factor should be discarded.

Over time, this process allows for construction of a rich database of targets that have been used, where/when they have been used, what the prediction was, what the actual result was. The database can also contain the correction factors used. More sophisticated statistical techniques may be used to compute correction factors.

In conjunction, with any of the prediction processes described above, the user devices (e.g., set-top boxes and/or televisions in the case of broadcast network television networks) can be configured so that each device will only deliver assets which are keyed to matching classifications, and will select to deliver an asset randomly from amongst the set of such assets with the highest delivery priority. The predicted impression deliveries of the asset over the total audience can then be calculated by multiplying the predicted deliveries over the sample by the size of the audience and dividing by the size of the sample.

The illustrated process 200 may also reject any asset that is determined to have too small of a prospective audience. For example, this functionality may be provided to conserve processing resources, bandwidth, storage resources, or the like. A new asset may fail to meet this threshold at the outset, or a previously scheduled asset may fall below this threshold because of audience diminution due to a newly scheduled asset. Accordingly, in the illustrated process 200, for each asset assigned to an asset delivery opportunity (220), an asset impression delivery proportion (an absolute audience size, "share" of the total audience for that asset delivery opportunity, or the like) can be compared (222) to a minimum threshold. If the proportion for an asset falls below this threshold, the asset can be rejected (216), e.g., not added to the schedule or removed from the schedule if previously scheduled. Otherwise, the asset is scheduled (224) and the expected impression delivery totals are updated (226). If the asset delivery opportunity is then filled to the desired level, the illustrated process 200 can proceed to the next asset delivery opportunity or, if no more remain, can terminate. Otherwise, a new asset that has not achieved its daily pacing value is considered for addition to the schedule for the current asset delivery opportunity.

An important part of the process described above is the module for predicting (212) the audience size for a given asset in a given asset delivery opportunity. In the context described above, this prediction is done for the purpose of determining whether to schedule the asset in the asset delivery opportunity. It should be appreciated, however, that the ability to estimate a size of a given audience segment and, more generally, the ability to estimate audience size and composition information associated with an asset delivery opportunity, or associated programming, can be used for a variety of other purposes. For example, audience estimation information can be used to manage inventory. In this regard, instead of estimating the audience for an asset in the context of scheduling a specific asset delivery opportunity, the audiences for assets may be projected over a larger time frame and used to manage inventory such that, for example, potentially distressed inventory can be identified, characterized, and prioritized for sale. This may be particularly useful in systems where raw behavior information, such as user click-stream information, is available for analysis in the network, e.g., where the click-stream information is available at a head end or other network node. In such cases, the network operator may be able to effectively predict decisions by individual devices.

This can also be used to determine whether to continue to sell inventory or whether it is sold out, e.g., based on understanding how inventory will be delivered in an aggregation context. It will be appreciated that there is nearly always a remnant of inventory left over after an initial round of scheduling and asset delivery. If these remnants can be better predicted and/or measured and characterized, such remnants can be targeted for sale, yielding enhanced revenues. Audience estimation information may also be used to supplement or supplant traditional ratings information used not only by advertisers but by content providers and others interested in understanding public trends and behaviors. In this regard, the sampling obtained by the prediction module of the present invention may be larger and may yield finer demographic or other information. Moreover, as the database used for predictions grows richer, it may be meaningfully queried not only for information relevant to particular programming or a particular time slot, but for information suggesting correlations of potential interest to sociologists, politicians, public planners and others, e.g., are there previously unknown geographic correlations for likely consumers of certain medications?

In various circumstances, it may be desirable to run the MASO scheduler for multiple days into the future, potentially for a number of months. This may be done to gather statistical information about potential future schedules. In one mode of operation, as an example, the scheduler is run on a daily basis to schedule the next two days, and on a weekly basis to project the next three 3 months.

The MASO scheduler may also provide reports concerning how the delivery of assets may proceed in the future. (This is one of the reasons that it may be desirable to run the scheduler for multiple days into the future.) By adding up the delivery predictions for each asset delivery opportunity within a time period, it is possible to predict the number of impressions that will be delivered for each asset during that time period. Future predictions for assets may be incorporated into the reports that include actual delivery statistics. Reports may be detailed or provide simple indicators that, for a particular asset, or group of assets (or all assets), report whether those assets are ahead, behind or on target with respect to delivery.

The system may further generate reports that characterize the inventory that remains unallocated. By accumulating the "remainders" of each asset delivery opportunity that are not allocated to any asset, an estimate of the remaining inventory may be formed. (This is another situation in which it may be desirable to iterate the MASO scheduler for several days into the future.)

The simplest way to express the quantity of the remaining inventory is to predict for various time periods the gross number of impressions that remain available. It may, however, be advantageous to characterize those impressions. Various ways of grouping the impressions would be one way to characterize them, for instance, characterizing the remaining impressions against some typical targets (it may be impractical do to this for all potential targets since there are likely hundreds of targets and millions of combinations of those targets). For example, it may useful to formulate a list of the top 20 targets that are bought by asset providers and report how many impressions of each type are available.

The detailed estimates for select targets may be easily calculated with a simple modification to process 200 describe above. For each asset delivery opportunity, once each actual asset has been considered in process step 208, each of the select targets may be considered as a pseudo asset with an unlimited daily target and a priority equal to the lowest priority in the system. The resulting impression predictions as determined in the step 212 for each of these equal priority pseudo assets can be accumulated in a remaining asset counts for associated targeting (note that in this circumstance a remaining household may counted multiple times—once for each of the pseudo assets it matches). For the pseudo assets, the actual scheduling of processing step 224 and the impression updates of step 226 need not be performed.

It would also be possible to calculate the likely overlap between the pseudo assets and report that information. Generally this can be done by finding the intersections between the $D_i$ vectors and counting the intersected audiences.

Given an existing set of schedules (i.e., schedules for one or more days) it is possible to re-run the scheduler against those schedules to introduce a single new asset and its associated targeting into the existing schedule. This could be accomplished in two distinctly different ways. The first would be to schedule the new asset as if it had the lowest possible priority and thus into only previously unallocated inventory. The alternative would be to reconsider each spot using the actual priority of the new campaign. This method may displace, or reduce the impressions of existing lower priority assets. It would be possible to characterize and report on the impact of this displacement.

A modification of the second method would be to first run the schedule in a "what if mode" where the schedule is not actually updated but the impact is assessed. If the impact is deemed acceptable then the scheduler could be run to update the schedule. If this is a common mode of usage it may be desirable during the initial scheduling process to leave some "headroom" (i.e., unallocated space) in each asset delivery opportunity. To implement this method the desired overhead would be accounted for in the steps of the process 200 involving the question "ADO is filled to the MAX?"

One mode of targeted asset delivery, described in the Invidi patent, is aggregation. Aggregation treats all asset delivery opportunities as equal. At a time very near to the start of an asset delivery opportunity a decision about which assets to deliver is made. In the case that assets are delivered in real time from upstream, a method called "Voting" (described in the Invidi patent) may be used to estimate the current audience and pick a small set of assets to send to all user equipment devices; the final decision about which asset to deliver is made at the UED. The voting process is usually performed minutes before the start of delivery opportunity and the final decision in the UED is made only seconds ahead of the opportunity. Alternatively, in the case that assets are stored on UEDs in a "forward and store" implementation, a decision is made locally by software in the UED about which asset to insert. This decision may be made only seconds before the asset is inserted. After asset deliveries are made, UEDs report upstream about the assets that were delivered. This is quite different from MASO where the scheduling system decides well ahead of time which assets are eligible for a particular opportunity and dictates priority to the UEDs.

One challenge in an aggregation-based system is to predict and manage the available inventory in the system. Because decisions are made very shortly before each delivery opportunity it is generally not known what will happen from day to day within the system. The infrastructure described for the scheduler may be modified and repurposed to predict how aggregation mode will work. Rather than use the scheduler to prepare schedules for the future it is used to predict how a group of independently functioning UEDs will make decisions.

The asset selection process in a UED may be quite complicated and may vary from one implementation to another. Common to almost all implementations will be a decision to deliver only those assets that have targeting that matches the household. Some examples of additional factors that may be used in the UED in making delivery decisions include priority (globally or locally determined), value (e.g. CPM), local impression targets, local pacing considerations, separation between delivery times of a particular asset, or competitive separation. Because of the variation in the selection mechanisms of the UEDs, the estimation mechanism will need detailed customization for a particular implementation.

Figure 3:
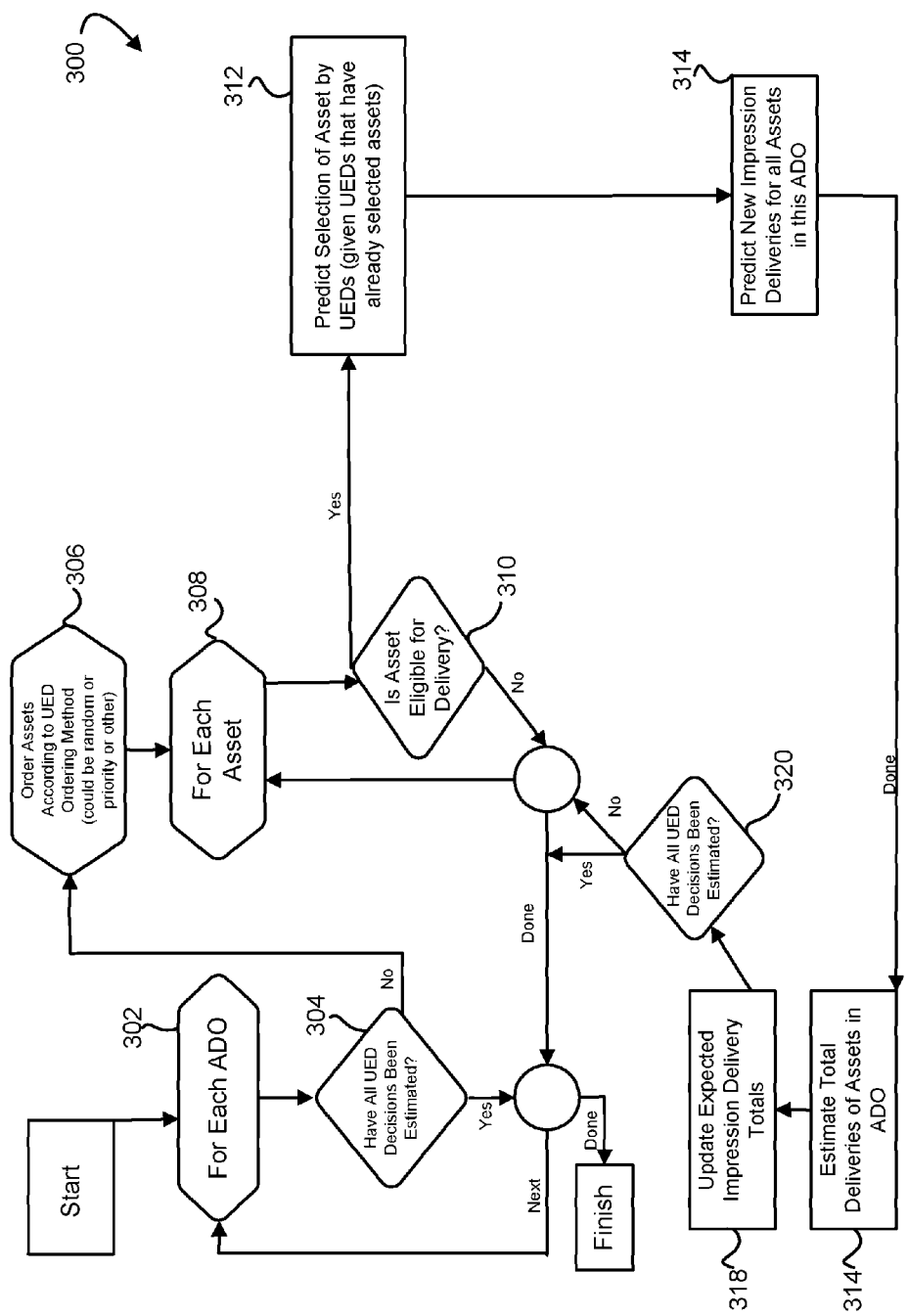
FIG. 3 is a flow chart illustrating an inventory management process in accordance with the present invention.

An outline of a typical estimation system is shown in FIG. 3. The illustrated process 300 has an overall structure similar to the scheduling process in that estimates are iteratively calculated for individual assets for a given asset delivery opportunity and then this process is repeated for subsequent asset delivery opportunities. However, assets are not actually scheduled as the purpose is to predict how devices will make delivery decisions. Thus, the process 300 is initiated by selecting (302) an asset delivery opportunity for consideration. For that asset delivery opportunity, a threshold determination is made as to whether decisions have been made (304) for all UEDs. If so, the process moves to the next asset delivery opportunity. Otherwise, assets are ordered (306) for consideration with respect to that asset delivery opportunity based on ordering rules that may be specific to each UED. Such ordering could be random, based on priority (generally based on criteria as described above, but potentially taking into account device specific considerations) or other.

Once the assets are ordered, for each asset (308), a decision (310) is made as to whether the asset is eligible for delivery. In this regard, an asset may be deemed ineligible, for example, based on any delivery constraints that are not satisfied. If the asset is not eligible, the next asset is considered. Otherwise, the audience estimation process is used to predict (312) UEDs that will deliver the asset, taking into account UEDs that have already selected an asset for that asset delivery opportunity. Alternatively, an arbitration (e.g., based on value of delivery) may be conducted as between a previously selected asset and the asset now under consideration. New impression delivery totals may then be predicted (314) for all assets in the asset delivery opportunity and total deliveries of assets in the asset delivery opportunity can be estimated (318). This process is then repeated for additional assets until all UEDs decisions have been estimated (320), at which point the process proceeds to the next asset delivery opportunity, if any.

A number of observations can be made with respect to the processes for scheduling and managing inventory. First, the MASO scheduler typically works a day at a time, whereas the aggregation estimation system may go a month or more into the future. Second, the output of the inventory management process will include a prediction on an asset-by-asset basis of how many impressions of each asset will be delivered and the rate of the delivery. As with the scheduler, this inventory management process can use the actual delivery statistics to form a real basis for what has been already delivered and then it can be rerun to again predict the future. The mode of operation would likely be to run the prediction on a daily basis—always predicting out for several weeks or months. There are pacing considerations at a high level in the inventory management process, but most (not all) UED selection algorithms may use a local pacing mechanism to decide if it should stop delivering a particular asset for a given time period. If so, an aggregate statistical mechanism should be used to estimate what the UEDs will do (this would be part of block (312)).

The illustrated system may also provide a "remaining inventory report" as described above. Similarly, new sales impact tests may be used to predict what happens when a new order is entered into the system and to which the UEDs respond. With respect to block (306) above the ordering may try to match the ordering in which UEDs will proceed through their asset lists. This can be problematic since different UEDs may pick different orderings (for instance if they have locally determined priorities). However, it is generally possible to pick an ordering that approximates what UEDs will do. The process at block (312) can still use the vectors A, B, C and D as described in the text. The goal is to decide what asset the UEDs will pick. A difficulty is that they may have local pacing or maximum impression targets that will cause them to make different decisions. This may be dealt with statistically.

The audience estimation process may use a random sample of devices to do its work. There are a number of observations that may be made in this regard. First, this process could use the entire population of devices. The reason to use a sample is that the sample will typically be orders of magnitude smaller than the whole population and consequently the computational requirement for dealing with the sample will also be orders of magnitude smaller. The use of the sample will introduce a sampling error into the process. The sample size will need to be large enough for the sample error to be acceptable. The selection of sample size to meet a particular error tolerance and confidence interval is a very well understood in statistics. As an example, roughly speaking, a random sample of 1000 devices will result in predictions that will have an error of plus or minus 3%, when extrapolated to the entire devices population, 19 times out of 20.

It is important that the sample of devices be random and uniform (unless stratified or over sampled as described below). Fortunately this is easy for the scheduler since it does not need to deal with non-responders. The sample used by the scheduler should be refreshed (i.e. a new set of devices is chosen for the sample) from time to time. At the limit, the sample could be refreshed each time a new asset delivery opportunity is considered. More practically a particular sample could be used for a number of asset delivery opportunities, a number of scheduler runs or a period of time. One reason to refresh the sample is that the underlying device population is constantly changing and a new sample will reflect that change. Another reason is that error will be reduced by periodically using new samples.

It may be desirable to use a stratified sample of devices. The use of a stratified sample may reduce the error in sampling. A stratified sample divides the total population into categories and them samples randomly from each category. For instance, it may be desirable to form a sample that is stratified by geography—devices could be categorized by zip code and random samples could be done proportionally in each zip code. It may be desirable to over sample some sub-populations within a sample. This is used as a method to reduce the error associated with "rare" sub populations.

With regard to the scheduling process, the above described method of calculated pacing is linear with respect to time, i.e., the pace is "impressions to deliver"/time period. This can be generalized in a couple of different ways. First a multi-level linear-time based model for pacing may be used or second, a non-linear model may be used. The multi-level method may be used to satisfy requests by an asset provider for irregular delivery. As an example, an asset provider may request that on a weekly basis 50% of their impressions be provided on Fridays and/or, another asset provider may request that 50% of their impressions be delivered between 8 am and 4 pm and the remainder delivered between 4 pm and midnight in an overall context of weekly delivery targets. In some circumstances it may be desirable to systemically over deliver assets early in a campaign or late in a campaign. This may result in a non-linear delivery model. In either case, these are easily dealt with in asset scaler described below.

Figure 4:
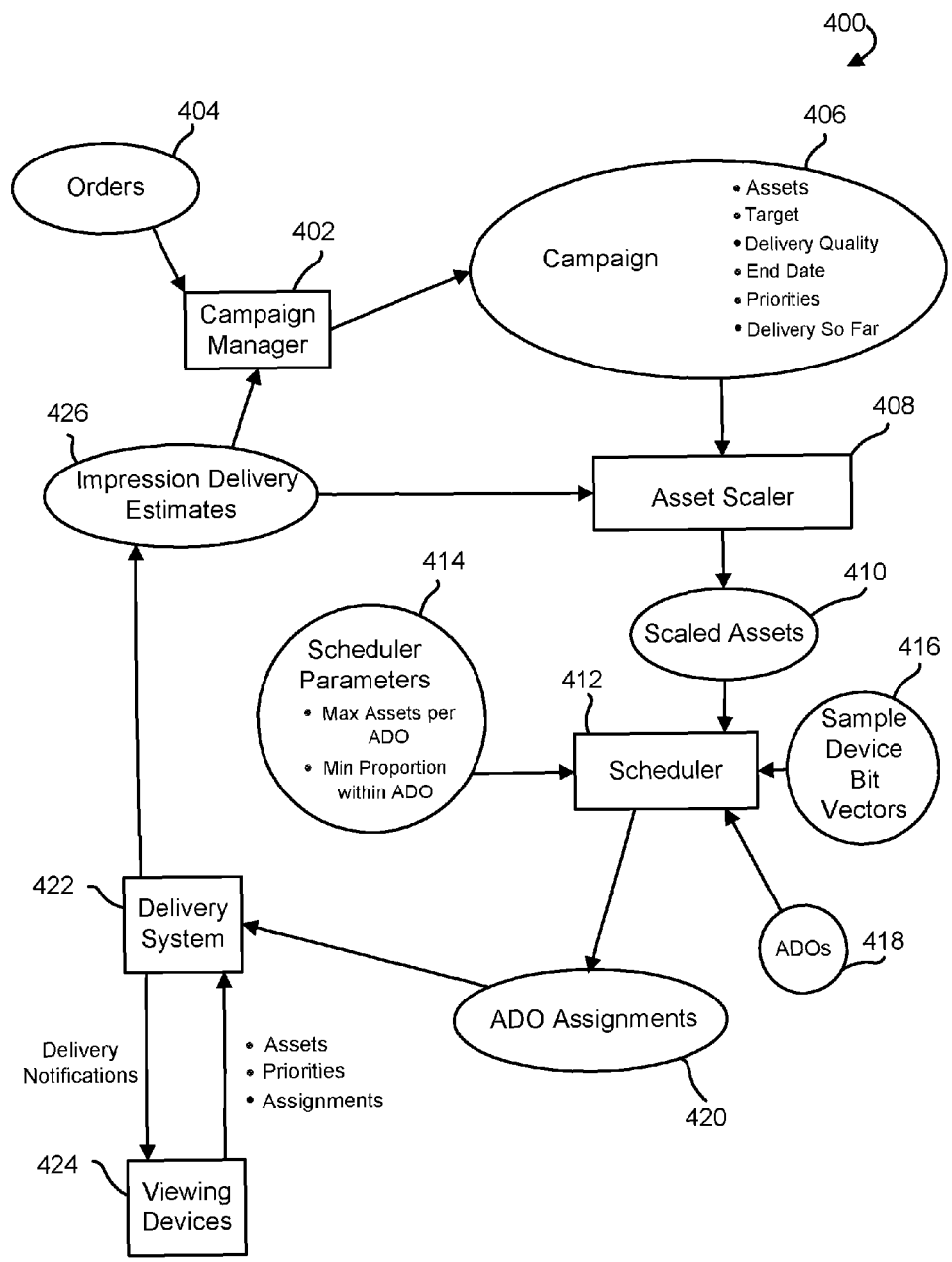
FIG. 4 is a schematic diagram of an asset scheduling and delivery system in accordance with the present invention.

FIG. 4 shows an illustrative impression delivery system 400, according to various embodiments of the invention. Functional elements of the system 400 are shown as rectangular boxes, and data or parameters considered or acted upon by the system 400 are shown as ellipses. The campaign manager 402 receives orders 404 from customers (asset providers) who wish to disseminate assets. This generates campaigns, composed of (in the illustrated example) an asset, a target (targeted audience), a delivery quantity, an end date, a priority, and a count of deliveries so far (which is initially zero). The campaigns 406 are read by the asset scaler 408, which appends a computed daily pacing onto each asset and its priority and provides these as scaled assets 410 to the scheduler 412.

The scheduler 412 is configured with a number of scheduler parameters 414, including the maximum number of assets to be assigned to a asset delivery opportunity, and the minimum proportion of predicted impression deliveries within a asset delivery opportunity that is acceptable for any assigned asset. Additional scheduler parameters may be included such as sample size, parameters that control refreshing of the sample, and factors related to testing for equality. It also accesses previously computed sample device bit vectors 416 that record which assets could play on which sample devices. The scheduler 412 is provided with the scaled assets 410 and the available asset delivery opportunities 418 for the next day within which the assets are to be placed, and constructs asset delivery opportunity assignments 420 of assets to asset delivery opportunities.

These asset delivery opportunity assignments 420 are sent to the delivery system 422, which communicates assets, priorities, and asset delivery opportunity assignments to the user devices 424. These user devices 424 in turn report delivery notifications back to the delivery system 422, which compiles them into impression delivery estimates 426. These estimates 426 are provided to the campaign manager 402 to update, track and report the count of deliveries for the campaigns, and to the asset scaler to use to calculate scale factors.

The various operations of methods described above may be performed by any suitable means capable of performing the corresponding functions. The means may include various hardware and/or software component(s) and/or module (s), including, but not limited to a circuit, an application specific integrate circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

While various embodiments of the present invention have been described in detail, further modifications and adaptations of the invention may occur to those skilled in the art. However, it is to be expressly understood that such modifications and adaptations are within the spirit and scope of the present invention.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for use in connection with scheduling and delivering multiple assets into each of one or more asset delivery opportunities of a communications network having scheduled asset delivery opportunities associated with programming or controlling inventory of said assets, comprising the steps of:

selecting first and second assets for audience estimation with respect to a first asset delivery opportunity of said network, said first and second assets having an interference due to interfering target audiences such that certain audience members belong to the targeted audience for both of said first and second assets;

estimating an audience size for at least one of said first and second assets for said first asset delivery opportunity taking into account said interference; and selectively scheduling at least one of said first and second assets for said asset delivery opportunity based on said estimating wherein said step of selectively scheduling comprises comparing said estimated audience size to a value based on a campaign specification for a respective one of said first and second assets.

2. A method as set forth in claim 1, wherein said step of selecting comprises identifying a set of assets potentially available for scheduling into said first asset delivery opportunity and, for each of successive ones of said assets, determining whether said asset should be considered for scheduling into said first asset delivery opportunity based on a status of deliveries of said asset in relation to a campaign delivery specification.

3. A method as set forth in claim 1, wherein said step of selecting comprises identifying a set of assets available for scheduling in said asset delivery opportunity based on campaign specifications of said assets, and establishing criteria for determining an order of consideration of said assets for scheduling.

4. A method as set forth in claim 1, wherein said step of estimating comprises identifying said first asset as having a higher priority than said second asset, and determining a reduced estimated audience size for said second asset due to said interference.

5. A method as set forth in claim 1, wherein said step of estimating comprises obtaining targeting parameters for each of said first and second assets, obtaining audience classification information based on signaling from a sampling of at least a portion of a prospective audience for said first and second assets, and using said targeting parameters and said classification information to generate an estimate value for said audience size for each of said first and second assets.

6. A method as set forth in claim 5, wherein said step of estimating comprises modifying said estimate value based on a difference between a previous estimate value and a corresponding actual audience size value.

7. A method as set forth in claim 1, wherein said value defines a maximum audience size currently desired for said respective one of said first and second assets, and said step of selectively scheduling comprises scheduling said respective one of said assets when said estimated audience size is less than or equal to said maximum audience size.

8. A method as set forth in claim 1, wherein said step of selectively scheduling comprises determining a total number of assets to be scheduled for said first asset delivery opportunity, said total number being greater than one, and using said total number in deciding whether to schedule at least one of said first and second assets.

9. A method as set forth in claim 8, wherein said total number is determined in relation to a constraint of said network related to one of processing resources, bandwidth and storage.

10. A method as set forth in claim 1, further comprising the step of transmitting multiple assets to a user equipment device together with information associating each of said multiple assets said first asset delivery opportunity.

11. A method as set forth in claim 10, further comprising operating said user equipment device to select one of said multiple assets to deliver at said first asset delivery opportunity.

12. A method as set forth in claim 11, wherein said user equipment device selects said asset based on at least one of classification information transmitted to said user equipment device and classification information inferred at said user equipment device based on monitoring states of said user equipment device.

13. A method as set forth in claim 11, further comprising reporting information from said user equipment device sufficient to identify said selected one of said assets.

14. A method comprising:
for a current asset delivery opportunity of a plurality of asset delivery opportunities:
  determining if the current asset delivery opportunity already has a maximum number of assets assigned to it;
  moving to a next asset delivery opportunity if the current asset delivery opportunity already has the maximum number of assets assigned to it; and
  if the current asset delivery opportunity does not already have the maximum number of assets assigned to it, ordering a plurality of assets by priority, and, in turn, for each current asset of the plurality of assets not already assigned to one of the plurality of asset delivery opportunities:
    calculating an increase in impression deliveries predicted for the current asset if it were added to those already assigned to the current asset delivery opportunity;
  if the increase would put total deliveries for the current asset over a daily pacing associated with the current asset, considering a next asset without assigning the current asset;
    if the increase would not put total deliveries for the current asset over a daily pacing associated with the current asset, calculating a number of impression deliveries predicted for each asset that would be assigned to the current asset delivery opportunity;
  if the calculated number of impression deliveries predicted for any asset is below a required minimum proportion of a global constraint, considering a next asset without assigning the current asset; and
  if no calculated number of impression deliveries predicted for any asset is below a required minimum proportion of a global constraint, scheduling the current asset into the current asset delivery opportunity.

15. A method comprising:
for a current asset delivery opportunity of a plurality of asset delivery opportunities:
determining if the current asset delivery opportunity already has a maximum number of assets assigned to it;
  moving to a next asset delivery opportunity if the current asset delivery opportunity already has the maximum number of assets assigned to it; and
  if the current asset delivery opportunity does not already have the maximum number of assets assigned to it, ordering a plurality of assets by priority, and, in turn, for each current asset of the plurality of assets not already assigned to one of the plurality of asset delivery opportunities:
calculating an increase in impression deliveries predicted for the current asset if it were added to those already assigned to the current asset delivery opportunity;
if the increase would put total deliveries for the current asset over a daily pacing associated with the current asset, considering a next asset without assigning the current asset;
if the increase would not put total deliveries for the current asset over a daily pacing associated with the current asset, calculating a number of impression deliveries predicted for each asset that would be assigned to the current asset delivery opportunity;
if the calculated number of impression deliveries predicted for any asset is below a required minimum proportion of a global constraint, considering a next asset without assigning the current asset; and
if no calculated number of impression deliveries predicted for any asset is below a required minimum proportion of a global constraint, scheduling the current asset into the current asset delivery opportunity.

* * * * *